(12) United States Patent
Biber

(10) Patent No.: US 11,317,166 B2
(45) Date of Patent: Apr. 26, 2022

(54) ADVERTISING CONTENT PRESENTED IN CONNECTION WITH TRICK PLAY OPERATION

(71) Applicant: Carl E Biber, Wilmington, NC (US)

(72) Inventor: Carl E Biber, Wilmington, NC (US)

( * ) Notice: Subject to any disclaimer, the term of this patent is extended or adjusted under 35 U.S.C. 154(b) by 0 days.

(21) Appl. No.: 14/484,261

(22) Filed: Sep. 12, 2014

(65) Prior Publication Data

US 2016/0080829 A1 Mar. 17, 2016

(51) Int. Cl.
*H04N 21/81* (2011.01)
*H04N 21/472* (2011.01)
*G11B 27/00* (2006.01)
*G06Q 30/02* (2012.01)
*G11B 27/10* (2006.01)

(52) U.S. Cl.
CPC ....... *H04N 21/812* (2013.01); *G06Q 30/0276* (2013.01); *G11B 27/005* (2013.01); *G11B 27/105* (2013.01); *H04N 21/47217* (2013.01)

(58) Field of Classification Search
CPC ........... H04N 21/812; H04N 21/44222; H04N 21/47202; H04N 21/4331; H04N 21/4316; H04N 21/47217; G06Q 30/0276; G11B 27/105; G11B 27/005
See application file for complete search history.

(56) References Cited

U.S. PATENT DOCUMENTS

| | | | | |
|---|---|---|---|---|
| 6,985,934 | B1 * | 1/2006 | Armstrong | G06Q 30/02 709/219 |
| 7,877,766 | B1 * | 1/2011 | Wu | G11B 27/105 725/22 |
| 9,099,152 | B2 * | 8/2015 | Marcus | G11B 27/034 |
| 9,106,942 | B2 * | 8/2015 | Menon | H04N 21/2668 |
| 2002/0144262 | A1 * | 10/2002 | Plotnick | |
| 2004/0030599 | A1 * | 2/2004 | Sie | G06F 17/60 |
| 2011/0255840 | A1 * | 10/2011 | Bornsen | H04N 5/91 |

* cited by examiner

*Primary Examiner* — Anthony Bantamoi

(57) ABSTRACT

An apparatus and method of managing video playback includes receiving user input associated with a trick play operation. In response to receiving the user input, a presentation of advertising content may be coordinated with data frames of the trick play operation. A presentation of the advertising content may be initiated such that the advertising content is displayed concurrently with the data frames of the trick play operation.

17 Claims, 4 Drawing Sheets

ADVERTISING CONTENT PRESENTED IN CONNECTION WITH TRICK PLAY OPERATION

I. CLAIM OF PRIORITY

This application is a continuation patent application of and claims priority from U.S. Provisional Patent Application Ser. No. 61/883,193, filed on Sep. 27, 2013, which is incorporated by reference herein in its entirety for all purposes.

II. FIELD OF THE DISCLOSURE

The present disclosure relates in general to the playback of recorded digital video and audio, and more particularly, to the management of advertising content in connection with a trick play operation.

III. BACKGROUND

Technological advances in the digitization and storage of media has revolutionized the way in which it is viewed. For example, viewers may rewind or fast forward through television programming and other audio/video content. The rewinding and fast forwarding can be performed at different speeds and at different times during a given broadcast data stream, and is often referred to as trick play, or trick mode operation. The use of trick play allows a viewer to skip over portions of recorded data that the viewer does not wish to watch or hear. During trick play, the presentation of the digital data stream, the video, audio and any closed-captioning data components are functionally disabled and are essentially dead air for the viewer.

The use of trick play allows a viewer to skip over recorded data that includes advertisements, which is contrary to what marketers are trying to obtain through their advertisements. Trick play often results in situations where the time and location for an advertisement is skipped over, and thus not viewed. Advertisement dollars spent by marketers are thus not effective for a viewer who uses trick play over advertisement content.

IV. SUMMARY

In a particular embodiment, a method of managing video playback includes receiving user input associated with a trick play operation. In response to receiving the user input, a presentation of advertising content may be coordinated with data frames of the trick play operation. A presentation of the advertising content may be initiated such that the advertising content is displayed concurrently with the data frames of the trick play operation.

In one example, the presentation of the advertising content may be displayed on a portion of a display. The presentation of the advertising content may be displayed on a portion of a display that is less than fifty percent of the available space of the display. The coordinating may include synchronizing a duration of the advertising content with an initialization of the data frames of the trick play operation. The coordinating may include buffering at least one of the advertising content and the data frames of the trick play operation.

In another particular embodiment, the presentation of the advertising content includes a percentage of prepared recorded material. The percentage may be selected based on a speed associated parameter of the trick play operation. The percentage may be selected based on fee paid to a provider.

In another example, markers may be embedded into the advertising content. The markers may be used in the coordinating. A speed associated with the trick play operation may be linked to one of a plurality of prerecorded of advertisements of differing lengths. The plurality of prerecorded of advertisements may be directed to a same product.

In another particular embodiment, the coordinating includes skipping a portion of the advertising content. For instance, the coordinating may include skipping a first portion of the advertising content to a default wrap-up portion of the advertising content. The coordinating may be based on a downloadable connection speed associated with at least one of video playback and the trick play operation. At least one of duration of the advertising content, a screen placement of the advertising content, a volume level of the advertising content, and a size of a display of the advertising content may be selectively based on a fee received by a provider.

In another example, the advertising content is received from a cloud communications device. The advertising content may include multiple advertisements. A priority of playback associated with the multiple advertisements may be selectable based on a fee to a provider. In an embodiment the length of a dead air space caused by a trick play operation may be used and matched to a length of an available advertisement(s) to select the advertising content.

In another particular embodiment, an apparatus includes a memory and a processor in communication with the memory. The processor may be configured to receive user input that initiates a trick play operation. In response to receiving the user input, the processor may coordinate a presentation of advertising content with data frames of the trick play operation, and may initiate a presentation of the advertising content such that the advertising content is displayed concurrently with the data frames of the trick play operation.

In an example, the coordinating includes buffering at least one of the advertising content and the video playback of the media content. The processor may further be configured to manipulate duration of the advertising content based on at least one of a speed associated parameter of the trick play operation, a fee paid to a provider, and a speed of a downloadable connection.

Embodiments may allow a viewer to skip over recorded data, while also allowing advertisers to effectively market their products and services. The advertisements may be viewed in a number of ways according to system configuration and paid marketing fees. Processes described herein may be executed on any electronic device configured to playback media content. These and other implementations, described herein may increase ad absorption and recapture return on investment on advertisement delivery efforts. The method and system may reduce skipping advertising content when a viewer activates a trick play operation.

V. BRIEF DESCRIPTION OF THE DRAWINGS

VI. DETAILED DESCRIPTION

Figure 1:
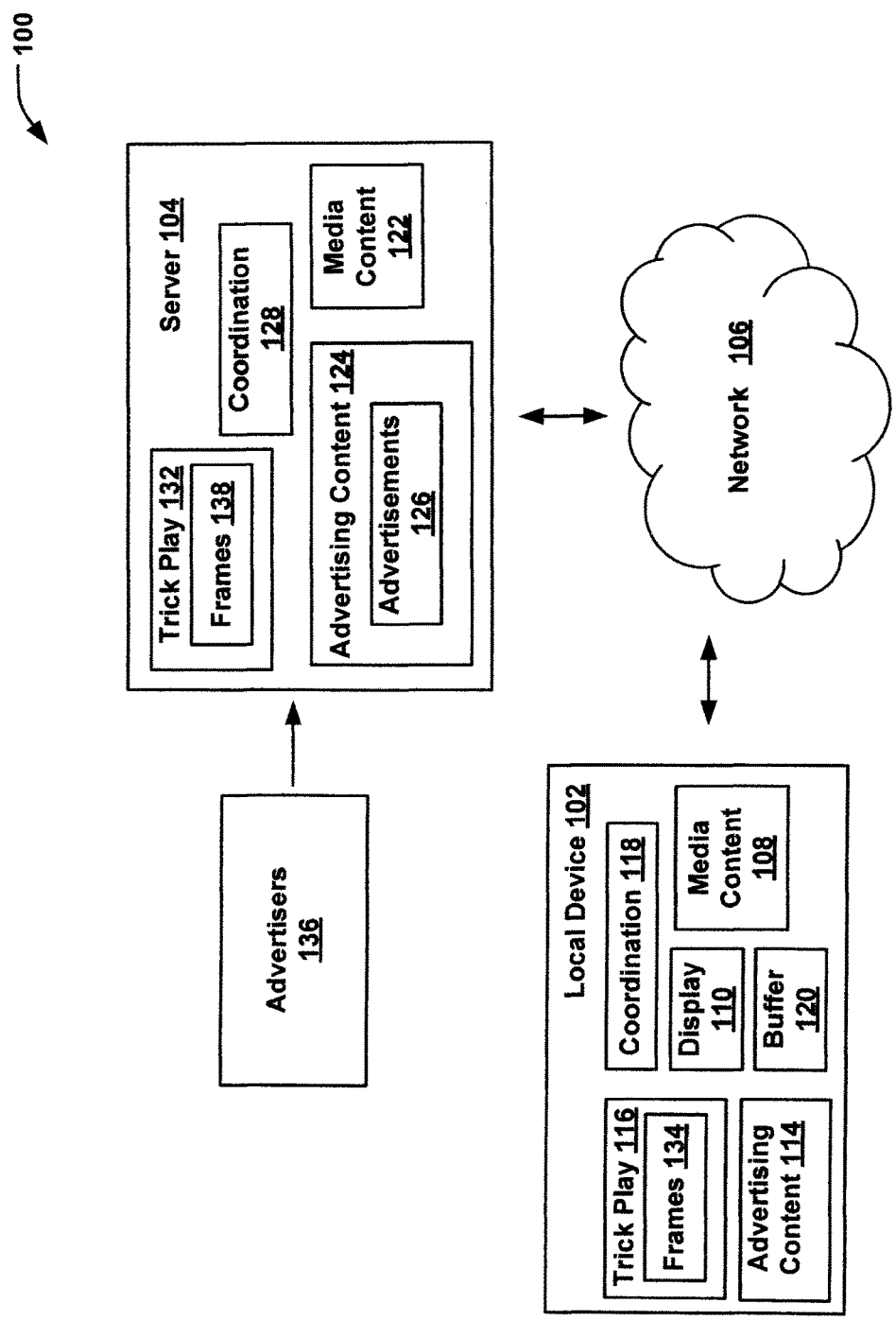
FIG. 1 is a block diagram of an illustrative implementation of a system to enable advertising content to be displayed in connection with a trick play operation.

A system and method manage the presentation of advertising content that includes an audio component and/or a visual component (e.g., static motion or motion video) when a trick play operation is initiated. The advertising content may be initiated when a viewer engages a trick play operation (e.g., when the viewer presses fast-forward, rewind, or pause). The advertising content may be presented in such a manner as to not completely obstruct the visual cues of the trick play operation (e.g., data frames of media content that is being paused, fast-forwarded, or rewound). For example, the advertising content may be displayed in a window over a portion of the video playback, or the video playback may be minimized to a window.

Advertising material in an embodiment may be activated when a DVR-type fast-forward, rewind or pause function is initiated. The advertising content may include at least one of an audio component and a visual component. The audio component may be verbal, spoken, music, or sounds. The visual component may include a static image or may be motion-oriented.

The advertising content may not completely (i.e., may only partially) obstruct view of the data frames of the trick play operation, and may not completely occupy, or take up, available area of a display. Thus, a viewer may recognize content being affected by the trick-play. As such, a viewer may stop a trick play operation based on their visual perception of the video playback being skipped. Enabling viewing of the playback video being manipulated by the trick play operation allows a user to see enough of the visual content being skipped to make an informative decision on halting the trick play operation. For instance, more than 50% of a display may be available to a viewer to make an informed decision, thus, the visual component of the advertising content may be less than 50% of the screen. In an example, space taken by a typical web crawler display on a display may be doubled in height.

In one example, advertising content is presented when trick play begins and ceases when trick-play is complete. The length of the trick play operation may determine the time opportunity for one or more advertisements to be delivered to a viewer. Initialization and completion of the trick play operation may thus be at the discretion of a viewer. Embodiments may and may not use scene markers or key frames in the video playback or advertising content. Frames for initializing trick-play and completing trick-play may be at the discretion of a viewer.

In a particular embodiment, advertising content lasts as long as a trick play operation does, and ceases when trick play operation end. The advertising content may include a mechanism to identify at least one of a beginning and an ending boundary. A boundary may allow buffering so that the advertising content may end in concert with the completion of the trick play operation. This feature may cause a slight pause in the playback of the recorded or live digital data stream to allow the advertising content to complete. According to another embodiment, a timeframe, or duration, predicted or assigned or otherwise associated with a trick play operation may be used to select advertising content having a corresponding duration.

The advertising content may be a condensed version of an existing television commercial that is activated and deactivated with trick play commands. The advertising content may not include playback, suspension, or scheduling of advertising content that was skipped by a given viewer using a trick play operation. The advertising content may be a separate and distinct product produced by a marketer to promote and advertise products or services.

Advertising content may include customized viewer information (e.g., a name or demographic based identifier associated with a user). Such customized viewer information may be received and used before or after the advertising content is presented.

Time elapsed during a trick play operation may determine a number of advertisement packages, or individual advertisements of the advertising content, that may be presented. In one example, if a viewer forwards through the half time of a football game, it may take 60 seconds to get through 15 minutes of playback video. The time may depend on the forward speed selected by the viewer. If the advertisement packages are produced as six second products, then the given viewer could experience ten advertisements during the forward trick play operation. Where the viewer rewinds through a scene in a movie and it takes six seconds to get through the content, the viewer may experience only one of the same advertisement packages during the rewind trick-play operation.

A delivery order of advertisement packages may vary. For instance, each unique and separate advertisement package may be loaded and play in a linear sequential manner up to a determined slot capacity. Alternatively, the packages may can be loaded as singles and play in a pre-determined order based on criteria established. For example, one may cost a first amount for a vendor, and another slot may cost a second, different amount. Advertisements packages of the advertising content may be loaded as singles and play in a random order. Queuing up advertisement packages for delivery when a trick play operation is activated may be realized in a multitude of structures depending on the strategy desired.

The advertising content may be positioned anywhere on the display, (e.g., lower bottom, left side, right side, upper top, center, etc.), and may embody on any shape (e.g., geometric and free form). The advertising content may further take on the appearance and presentation through any style desired (e.g., fading in and out, movement from one location of the screen to another location on the same screen). Where so configured, multiple windows of advertising content may appear concurrently on the display at different locations. The advertising content may be related to the same or a different product and sponsor. In an example, the presentation of the advertising content may include displaying content on multiple spaces on the display at the same time and/or in concert with audio.

The adverting content of an embodiment may include a hyperlink to initiate the presentation of related advertising content. For instance, a static advertisement comprising the content may be displayed in a corner of the display. A viewer, interested in the advertisement, may use a remote or touch screen selector to click on the static advertisement. In response, a hyperlink associated with the advertising content may be activated and may prompt a presentation of additional advertising content. For example, a video prepared by the advertiser may be presented to the viewer in a window formerly occupied by the static advertisement. In another embodiment, the initial advertisement (having an underlying hyperlink) may include video and may link to another video or a website.

The location on the display at which the advertising content is displayed may determine the pricing of the advertising content. The display may thus be defined, stratified and parceled up into separate and individual markets, each with their own attached pricing, and each with their own typical market characteristics. For example, advertising content that uses 10% of the total space with a rectangular shape in the lower bottom center of the display would be priced differently and tiered in relationship to advertising content that uses more or less of the display with any other shape desired that is presented in any other location portion of the display.

The advertising content may be stored locally at the displaying device or may be received from a remote cloud network source. The advertising content may be generated by an automated advertising network. An automated advertising network may include a software based, host platform for buyers and sellers to deal advertising content.

The advertising content may include markers used to create a repeatable loop. For instance, the advertising content may loop until the end of a trick play operation. In another example, the playback content may include one or more markers on the digital data stream that allows for the viewer to experience an automatically repeatable loop. For instance, if a viewer is watching a guitar lesson on a media player on a pre-recorded data stream, the viewer could, through various mechanisms, determine a point in the data stream where he or she could view the data stream selected over and over until it is discontinued. More specifically, a viewer may select a 15 second segment of the data stream to repeat itself in an attempt by the viewer to learn and understand an aspect of the guitar lesson. An embodiment may include an infinite loop of playback content by placing markers that denote a beginning and an end of a loop.

Synchronization the advertising content with the trick play operation may include buffering and timing processes at the beginning of the trick play operation so that the advertising content is inserted properly. The timing and buffering may also occur near the end of the trick play operation so that the advertising content concludes at a desired point.

In another embodiment, only the advertising content may end more abruptly (e.g., without being completed). Advertising content may be initiated and synchronize at the beginning of a trick play operation, but may be cut off at the conclusion of the trick play operation, regardless of whether an advertisement of the advertising content has concluded. This embodiment may have processing and memory resource savings over other embodiments where the completion of the advertising content is coordinated with the completion of the trick play operation.

Referring to FIG. 1, a diagram depicting an illustrative implementation of a system to present advertising content during a trick play operation is shown and generally designated 100. As shown in FIG. 1, the system 100 includes a local computing device 102 in communication with a remote computing device, such as a server computer 104, via a network 106. The local device 102 may include an apparatus configured to present media content 108 on a display 110. As such, an illustrative electronic device 102 may include a set top digital video recorder (DVR), computer, or portable communications device, such as a phone. The device 102 may include a main memory for recording and storing digital data streams for viewing. The hard drive may also provide an ability to watch a live or recorded data stream, as well as to record, to pause, and rewind a live or recorded data stream. While the display 110 is shown as being incorporated into the local device 102, a display of another embodiment may include one or more displays that are remote from the device 102.

In addition to the playback media content 108, a memory of the local device 102 may store advertising content 114, a trick play algorithm 116, a trick play coordination program 118, and a buffer 120. As described herein, the playback media content 108 may include video data frames that are streamed or recorded from memory. The advertising content 114 may include one more of video, static image, and audio data. In one embodiment, the trick play algorithm 116 may execute an operation that uses data frames 134 to mimic the visual feedback given during a fast-forward, pause, and rewind operation. In another embodiment, the trick play algorithm 116 may execute an operation that shows visual feedback frames 134 of the video playback content actually being fast-forwarded, paused, and rewound.

The trick play coordination program 118 may manage the presentation of the advertising content 114 when a trick play operation is initiated. The advertising content 114 may be presented in such a manner as to not completely obstruct the trick play visual cues (e.g., data frames 134 of media content 108 that is being paused, fast-forwarded, or rewound). For example, the advertising content 114 may be displayed in a window over a portion of the video playback, or the video playback may be minimized to a window.

A duration of a trick play operation may generally or precisely coincide with that of the fast-forward, pause, or rewind operation. The trick play coordination program 118 may coordinate a presentation of advertising content 114 with at least one of the media playback content 108, the trick play algorithm 116, and a function affecting the playback speed of the video playback content 108 (e.g., the fast-forward, pause, or rewind operation). The buffer 120 may be configured to temporarily store at least one of the media playback content 108 and data frames 134 relating to the trick play algorithm 116.

In a particular embodiment, advertising content 114 lasts as long as a trick play operation does, and ceases when trick play operation end. The advertising content may include a mechanism to identify at least one of a beginning and an ending boundary. A boundary may allow buffering so that the advertising content may end in concert with the completion of the trick play operation. This feature may cause a slight pause in the playback of the recorded or live digital data stream to allow the advertising content to complete. According to another embodiment, a timeframe, or duration, predicted or assigned or otherwise associated with a trick play operation may be used to select advertising content having a corresponding duration.

The advertising content 114 may be a condensed version of an existing television commercial that is activated and deactivated with trick play commands. The advertising content 114 may include customized viewer information. The adverting content 114 of an embodiment may include a hyperlink to initiate the presentation of related advertising content. The advertising content may include markers used to create a repeatable loop, as discussed herein. In another example, the media content 108 may include one or more markers on the digital data stream that allows for the viewer to experience an automatically repeatable loop.

Time elapsed during a trick play operation may determine a number of advertisements 126 of the advertising content 114 that may be presented. A delivery order of advertisements 126 may vary according to a fee schedule paid by advertisers 136.

The server computer 104 may include media playback content 122, as well as advertising content 124. The advertising content may include a plurality of advertisements 126. The stored advertisements 126 may be different lengths.

According to a particular embodiment, a trick play coordination program 128 at the remote server 104 may manage playback of the advertising content 114 or 124 and the trick play algorithm 132 or 116 at the display 110. In another embodiment, the trick play coordination program 118 at the local device 102 may manage the playback of the advertising content 124 or 114 and the trick play data 134 or 138 at the display 110. Still another embodiment may use both trick play coordination programs 118, 128 at the local and remote devices 102, 104 to manage playback of the advertising content 114 or 124 and the trick play data 130 or 134 at the display 110. Providers of the advertising content 124 may upload data via a networked device 136 in communication with the remote device 104.

Synchronizing the advertising content 114 with the trick play operation may include buffering and timing processes at the beginning of the trick play operation so that the advertising content is inserted properly. Where desired, the timing and buffering may also occur near the end of the trick play operation so that the advertising content 114 concludes at a desired point.

Figure 2:
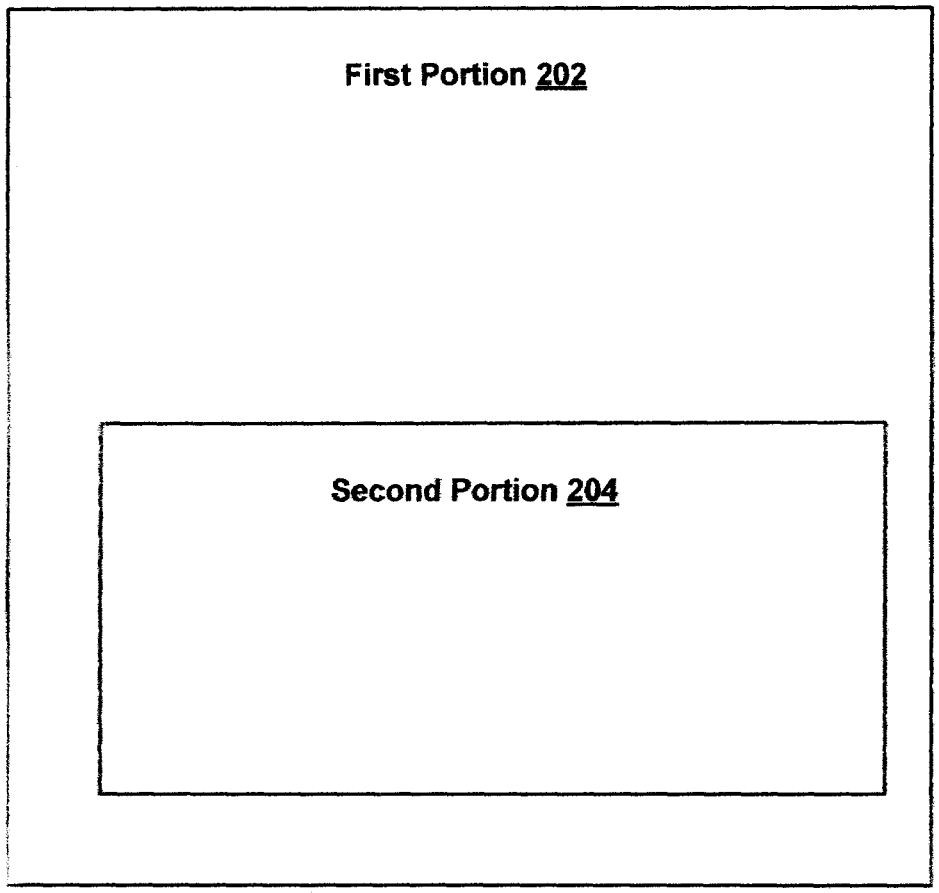
FIG. 2 illustrates an embodiment a display, such as the display of FIG. 1, configured to concurrently display advertising content and data frames of a trick play operation.

FIG. 2 illustrates a display 200, such as the display 110 shown in FIG. 1. The display 200 includes a first portion 202 and a second portion 204. The first portion 202 may present data frames associated with a trick play operation. For example, the trick play operation may present frames of video content being fast forwarded, paused, or rewound.

The advertising content may be presented in the second portion 204 in such a manner as to not completely obstruct the video playback that is being paused, fast-forwarded, or rewound. The second portion 204 may comprise a picture-in-picture (PiP) or a popup window. The advertising content may be presented in the second portion 204 while a viewer is able to monitor the status of the trick play operation via the first portion. A viewer may recognize content being affected by the trick-play by virtue of the first portion 202. As such, a viewer may stop a trick play operation based on their visual perception of the video playback being skipped. In an embodiment, at least 50% of the display 200 is be available to a viewer to make an informed decision.

Figure 3:
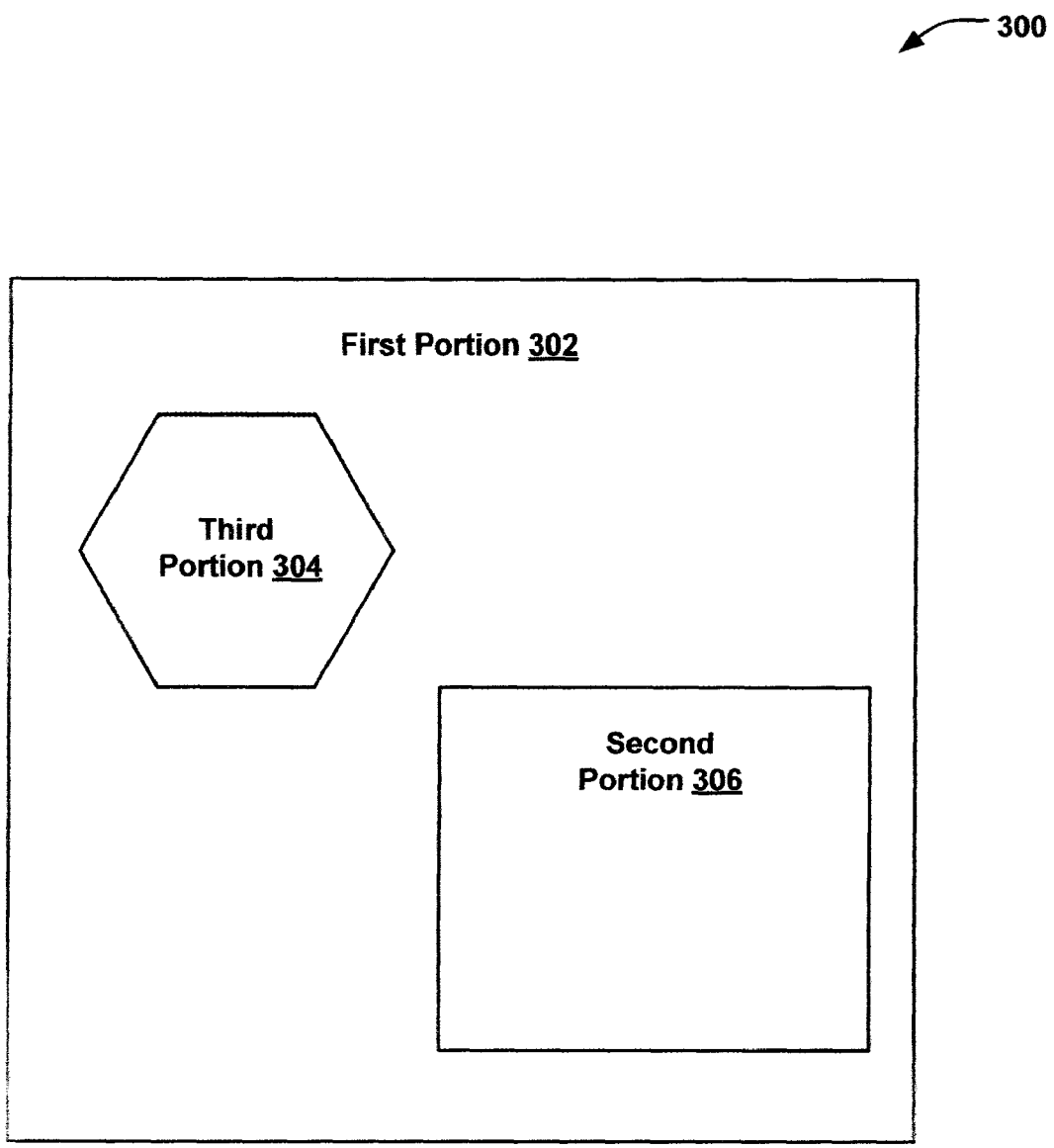
FIG. 3 illustrates another embodiment a display configured to concurrently display advertising content and data frames of a trick play operation.

FIG. 3 shows another embodiment of a display 300 that is consistent with an embodiment of the system 100 of FIG. 1. The display 300 shown in FIG. 3 includes at first portion 302, in addition to second and third portions 304, 306, respectively. The first portion may playback video associated with a trick play operation, similarly to the first portion 202 of FIG. 2. The second and third portions 304, 306 may include a static image or video presentation of advertising content. The second and third portions 304, 306 may assume different shapes and locations, and may play related or unrelated advertising material. The advertising content may further take on the appearance and presentation through any style desired (e.g., fading in and out, movement from one location of the screen to another location on the same screen). The placement and size and/or volume associated with the first and second portions 304, 306 may be determined according to a fee schedule available to advertisers.

Figure 4:
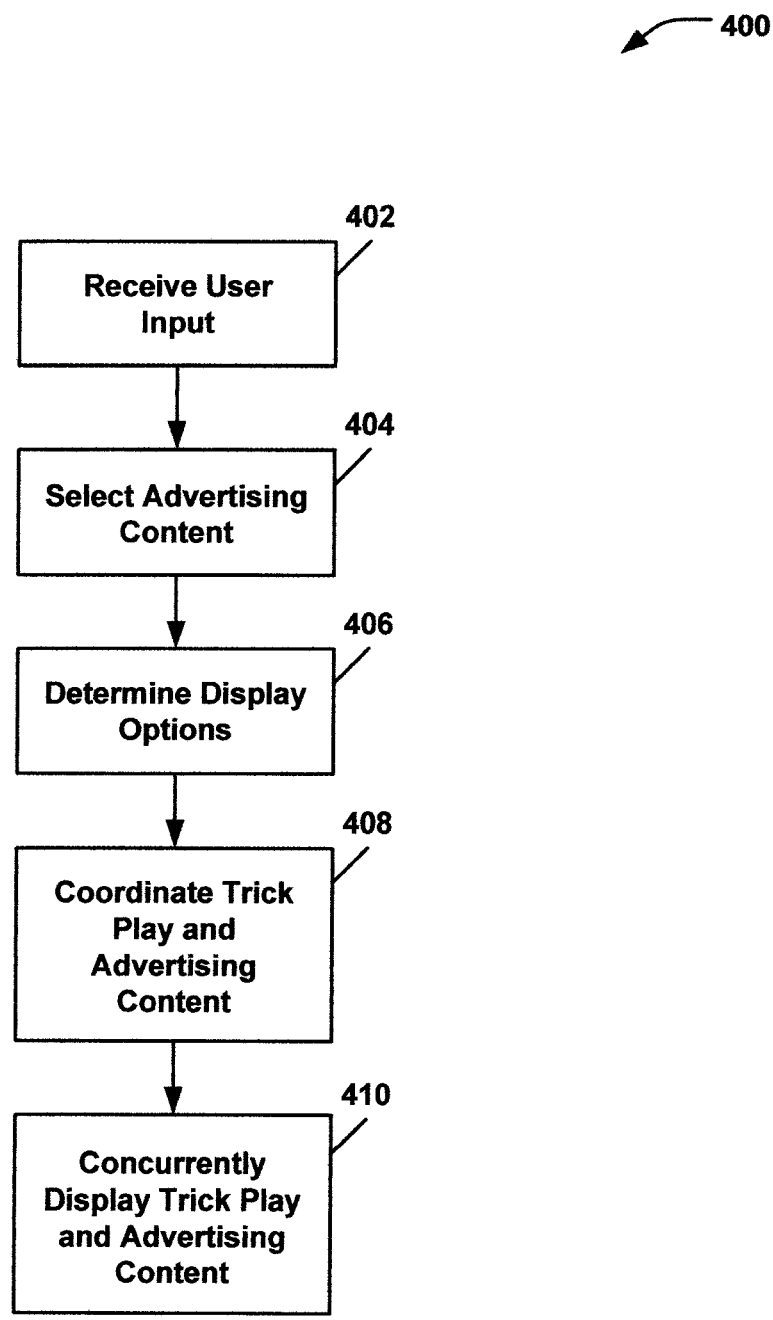
FIG. 4 is a flowchart of an illustrative implementation of a method executable by a system, such as the system of FIG. 1, to display advertising content during a trick play operation.

FIG. 4 is a flowchart of an illustrative implementation of a method 400 of displaying advertising content during a trick play operation. Turning more particularly to the flowchart, user input may be received at 402. The user input may include a command received by a viewer via a remote control to initiate a trick play operation (e.g., to rewind or fast forward content).

In response to the user input, advertising content may be selected at 404 for display. The advertising content may include multiple advertisements. A priority of playback associated with the multiple advertisements may be selectable based on a fee to a provider. In an embodiment the length of a dead air space caused by a trick play operation may be used and matched to a length of an available advertisement to select the advertising content.

Display options may be determined at 406. For example, a controller may determine which portion or portions of a display will be used to present the advertising content, as well as in what sequence and relative location the content may be displayed. At least one of duration of the advertising content, a screen placement of the advertising content, a volume level of the advertising content, and a size of a display of the advertising content may be selectively based on a fee received by a provider.

At 408, the trick play operation may be coordinated with the advertising content. More particularly, a presentation of the advertising content may be coordinated with data frames of the trick play operation. Coordination processes may include synchronizing a duration of the advertising content with an initialization of the data frames of the trick play operation. The coordinating may include buffering at least one of the advertising content and the data frames of the trick play operation.

In another example, markers may be embedded into the advertising content. The markers may be used in the coordinating. A speed associated with the trick play operation may be linked to one of a plurality of prerecorded of advertisements of differing lengths. The plurality of prerecorded of advertisements may be directed to a same product.

In another particular embodiment, the coordinating includes skipping a portion of the advertising content. For instance, the coordinating may include skipping a first portion of the advertising content to a default wrap-up portion of the advertising content.

The advertising content may be concurrently displayed at 410 with the trick play operation. A presentation of the advertising content may be initiated such that the advertising content is displayed side by side or substantially simultaneously with the data frames of the trick play operation. In one example, the presentation of the advertising content may be displayed on a portion of a display. The presentation of the advertising content may be displayed on a portion of a display that is less than fifty percent of the available space of the display.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of managing video playback, the method comprising:
    at a server, retrieving a plurality of data frames comprising programming content;
    receiving user input at a local computing device, the user input initiating a trick play operation on the programming content, wherein the trick play operation includes any of a pause, a rewind, and a fast forward operation;
    communicating the trick play operation to the server;
    selecting advertising content based on at least one of a speed associated with the trick play operation and how long the trick play operation is predicted to last;
    retrieving the advertising content at the server, wherein the advertising content is not embedded in the plurality of data frames; and
    in response to the trick play operation, coordinating at the sever at least a portion of the trick play operation such that during a dead air space of the trick play operation the programming content affected by the trick play operation is still visible on a display screen of the local computing device while advertising content is displayed, wherein a duration of the advertising content is cut short at a conclusion of the trick play operation.

2. The method of claim 1, wherein the advertising content includes at least one of audio, video, and a hyperlink.

3. The method of claim 1, wherein a presentation of the advertising content is displayed on a portion of a display.

4. The method of claim 1, wherein a presentation of the advertising content is displayed on a portion of a display that is less than fifty percent.

5. The method of claim 1, wherein the displaying includes synchronizing the duration of the advertising content with an initialization of the trick play operation.

6. The method of claim 1, wherein the displaying includes buffering at least one of the advertising content and the data frames of the trick play operation.

7. The method of claim 1, wherein a presentation of the advertising content includes a percentage of prepared recorded material.

8. The method of claim 7, further comprising selecting the percentage based on the speed associated with the trick play operation.

9. The method of claim 7, further comprising selecting the percentage based on fee paid to a provider.

10. The method of claim 1, further comprising embedding markers in the advertising content, wherein the markers are used in the coordinating.

11. The method of claim 1, further comprising linking the speed associated with the trick play operation to one of a plurality of prerecorded of advertisements of differing lengths, wherein the plurality of prerecorded of advertisements are directed to a same product.

12. The method of claim 1, wherein the displaying includes skipping a portion of the advertising content.

13. The method of claim 1, wherein the displaying includes skipping a first portion of the advertising content to a default wrap-up portion of the advertising content.

14. The method of claim 1, wherein at least one of the duration of the advertising content, a screen placement of the advertising content, a volume level of the advertising content, and a size of a display of the advertising content is selectively based on a fee received by a provider.

15. The method of claim 1, wherein the advertising content is received from a cloud communications device.

16. The method of claim 1, wherein the advertising content includes multiple advertisements, and wherein a priority of playback associated with the multiple advertisements is selectable based on a fee to a provider.

17. The method of claim 1, wherein the displaying is based on a downloadable connection speed associated with at least one of video playback and the trick play operation.

* * * * *